(12) United States Patent
Kijima et al.

(10) Patent No.: US 6,627,113 B2
(45) Date of Patent: Sep. 30, 2003

(54) PHOSPHOR CONSISTING OF HOLLOW PARTICLES, PHOSPHOR SLURRY, PHOSPHOR BEADS FOR ANALYSIS USING TRACER TECHNIQUE AND THEIR PRODUCTION PROCESSES

(75) Inventors: Naoto Kijima, Yokohama (JP); Taiichiro Miwa, Odawara (JP)

(73) Assignee: Kasei Optonix, Ltd., Odawara (JP)

( * ) Notice: Subject to any disclaimer, the term of this patent is extended or adjusted under 35 U.S.C. 154(b) by 147 days.

(21) Appl. No.: 09/837,452

(22) Filed: Apr. 19, 2001

(65) Prior Publication Data

US 2001/0032963 A1 Oct. 25, 2001

(30) Foreign Application Priority Data

Apr. 20, 2000 (JP) ........................................ 2000-119634
Nov. 6, 2000 (JP) ........................................ 2000-337219

(51) Int. Cl.$^7$ .......................... G01N 1/00; C04K 11/02; C04K 11/08

(52) U.S. Cl. .................. 252/301.4 R; 252/301.4 S; 252/301.4 P; 252/301.4 R; 252/301.4 H; 252/301.5; 252/301.6 R; 252/301.6 S; 252/301.6 P; 252/301.6 F

(58) Field of Search ................. 252/301.4 R, 301.4 P, 252/301.4 H, 301.4 F, 301.4 S, 301.5, 301.6 R, 301.6 P, 301.6 F, 301.6 S

(56) References Cited

U.S. PATENT DOCUMENTS 2,314,699 A * 3/1943 Hale .................. 252/301.6 F
3,668,455 A * 6/1972 Dale et al. ............. 252/301.4 R

FOREIGN PATENT DOCUMENTS

JP      11-349324     * 12/1999

* cited by examiner

Primary Examiner—C. Melissa Koslow
(74) Attorney, Agent, or Firm—Oblon, Spivak, McClelland, Maier & Neustadt, P.C.

(57) ABSTRACT

A phosphor consisting of hollow particles, each hollow particle having an outer shell and a space in the inside of said outer shell.

6 Claims, 6 Drawing Sheets

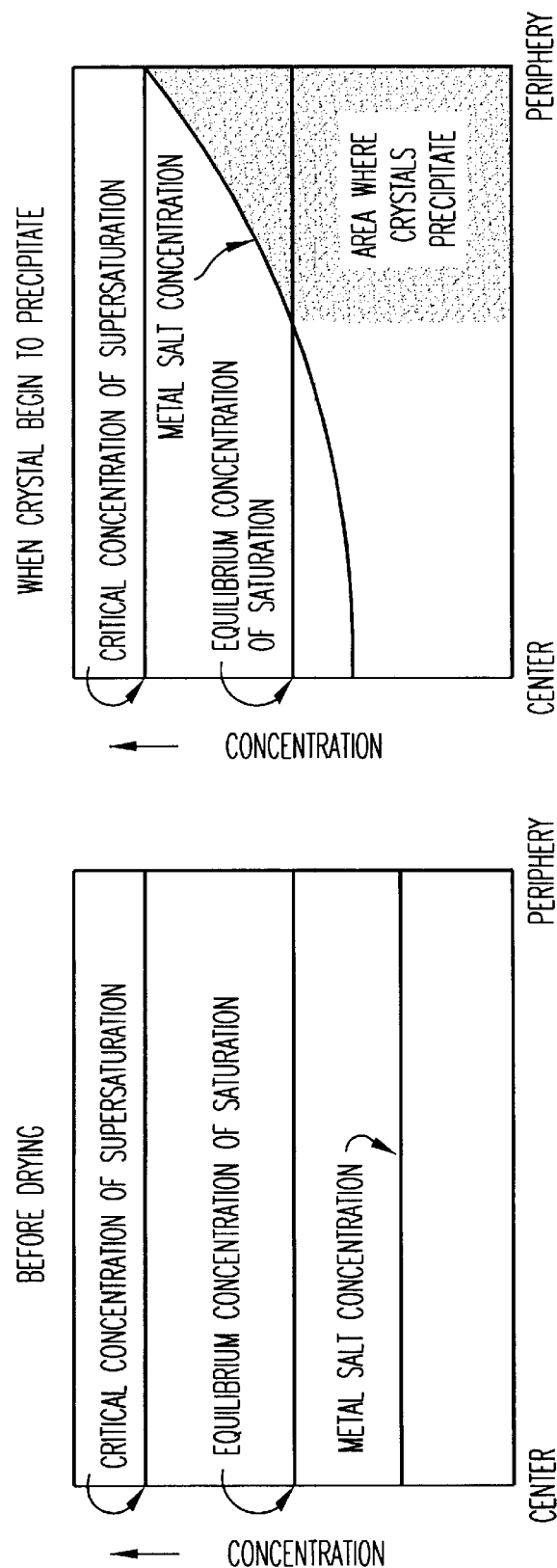

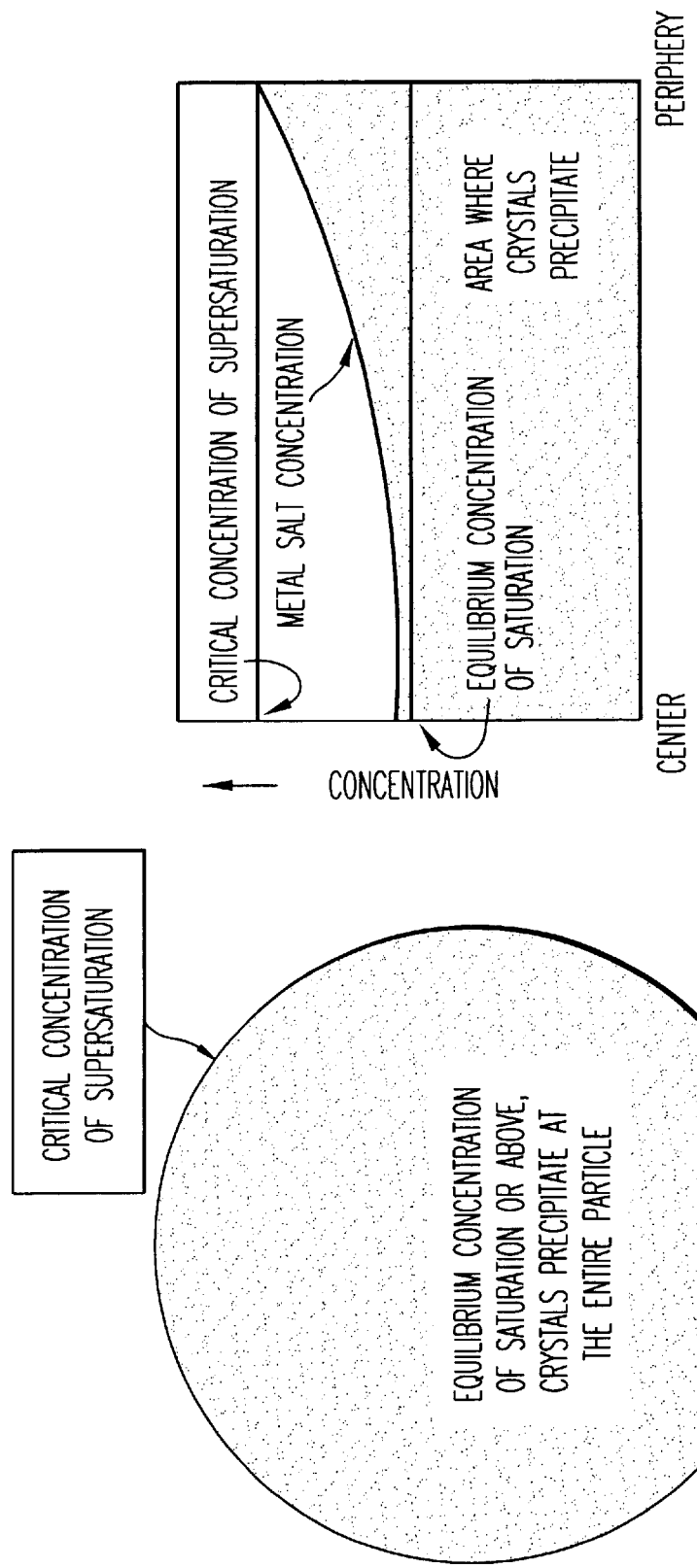

PHOSPHOR CONSISTING OF HOLLOW PARTICLES, PHOSPHOR SLURRY, PHOSPHOR BEADS FOR ANALYSIS USING TRACER TECHNIQUE AND THEIR PRODUCTION PROCESSES

BACKGROUND OF THE INVENTION

1. Field of the Invention

The present invention relates to a phosphor suitable for formation of a fluorescent layer for e.g. a fluorescent lamp, a plasma display panel (PDP) or a vacuum fluorescent display (VFD), a phosphor slurry, phosphor beads used for analysis using tracer technique such as radioimmunoassay together with a radioactive labeled compound, and their production processes.

2. Discussion of Background

A phosphor to be used for a fluorescent lamp, PDP or VFD has been obtained, in the same manner as a phosphor to be used for a cathode ray tube (CRT) or for other applications, by mixing raw material powders, followed by heating in a baking container such as a crucible at a high temperature for a long period of time so that a solid reaction takes place to form a phosphor consisting of solid particles, which are pulverized by e.g. a ball mill to obtain a phosphor powder.

However, when a phosphor produced by the above method is used as a fluorescent layer for a device such as a fluorescent lamp, PDP or VFD, e.g. ultraviolet rays, vacuum ultraviolet rays or low voltage electron beam as an excitation source, having a weak penetrating power, can not excite the inside of the phosphor but excite the surface layer of the phosphor alone for light emission. Therefore, the region which contributes to the light emission is limited to the surface layer of the phosphor. Accordingly, the region which contributes to the light emission is an extremely limited surface layer alone in the phosphor used for the fluorescent layer, which increases the production cost of a device.

Further, in a case of a fluorescent layer for a three component type fluorescent lamp for example, a mixed phosphor slurry containing a plural types of phosphors having different emission colors is subjected to sedimentation coating method, and if there is a significant difference in specific gravity among the phosphors mixed, unevenness in composition may be caused due to difference in sedimentation rate during the coating, thus causing non-uniformity in the emission color.

Aside from this, a phosphor is used also in fields of medicine and industrial technology. Namely, in the fields of medicine and industrial technology, it is necessary to detect the presence of a small amount of an organic substance such as an antigen, an antibody, a hormone, a metabolic substrate, an enzyme or a medicine. Many biological analysis methods have been developed to detect a small amount of such an organic substance. Among them, a representative analysis method is analysis using tracer technique of detecting a binding of an organic substance to a reactant which biochemically specifically reacts with said organic substance, wherein a labeled compound (tracer) is fixed to either the organic substance or the reactant. Radioimmunoassay is a representative example thereof.

Radioimmunoassay utilizes a specific binding of an antibody (Ab) to a specific target antigen (Ag). To a mixture of an antigen (Ag) and a certain amount of an antigen (Ag*) having a labeled compound (tracer) fixed thereto, a certain amount of an antibody (Ab) is added, followed by incubation, and Ag-Ab (non-labeled bound complex) and Ag*-Ab (labeled bound complex) are formed due to an antigen-antibody reaction. Here, if the amount of the antibody (Ab) is made to be relatively small as compared with the amount of the antigen (Ag+Ag*), (Ag) and (Ag*) competitively bind to the antibody (Ab), and accordingly the proportion of the Ag-Ab (non-labeled bound complex) and Ag*-Ab (labeled bound complex) depends on the amount of (Ag). Here, the bound complexes and free (Ag*) are separated and the amount of the labeled compound (tracer) in the labeled bound complex (Ag*-Ab) is measured to determine the amount of the antigen (Ag) in an unknown sample from an analytical curve showing the relation between the amount of the labeled compound (tracer) and the amount of the antigen (Ag), preliminarily obtained by using a known amount of the antigen (Ag).

As the labeled compound (tracer) to be used in the above method, a radioactive isotope (RI) may be used, or RI and a fluorescent material may be used in combination. In a case where a radioactive isotope is used alone as a labeled compound, radiation from Ag*-Ab (labeled bound complex) are measured by using a radiation detector such as a scintillation counter.

Further, in a case where RI and a fluorescent material are used in combination as a labeled compound (tracer), RI is fixed to either the antigen (Ag) or the antibody (Ab), and the fluorescent material is fixed to the other, and fluorescence emitted from an antigen-antibody bound complex is measured by a photodetector such as a photomultiplier or a CCD camera.

The reaction proceeds in a liquid. The range of radiation from RI becomes shorter in a liquid, although it depends on the type of RI, and accordingly fluorescence can be detected when a fluorescent substance is present at a very short distance from RI. Namely, fluorescence from a bound complex of an antigen and an antibody can be detected, however, no fluorescence from a fluorescent substance fixed to an antigen or an antibody which is not combined with an antigen or an antibody labeled with RI can be detected even when the fluorescent substance receives radiation from RI in a liquid. Accordingly, it is not necessary to separate antigen-antibody bound complexes and an uncomplexed antigen or antibody, as in a conventional radioimmunoassay.

Here, a fluorescent material is usually produced by mixing phosphor raw material powders, putting the mixture into a baking container such as a crucible and heating it at a high temperature for a long period of time so that a solid reaction takes place, followed by pulverization into fine particles by e.g. a ball mill and classification to produce phosphor particles. In such a method, irregular particles in a form of sheets, columns or fragments and having an average particle size exceeding 2 μm are produced, and crude aggregated particles having a plurality of such particles aggregated are present in a considerable amount. Further, as such particles are solid particles, the specific gravity of the particles is the same as the true specific gravity of the phosphor and is rather large.

If such phosphor particles are used as phosphor beads for analysis using tracer technique, since the phosphor beads have irregular shapes, it tends to be difficult to uniformly coat the phosphor beads with an organic substance to be measured such as an antigen or antibody or its reactant in an adequate amount, and it also tends to be difficult to uniformly disperse the phosphor beads in the reaction system of e.g. an antigen or an antibody. Accordingly, a uniform reaction tends to be inhibited, which causes decrease in accuracy of analysis.

Further, in a case of carrying out a survey of new drugs by using many wells so that a plurality of samples to be measured are simultaneously reacted, such as in a High Throughput new drug Screening system, a slurry of phosphor beads having an organic substance to be measured or its reactant coated (fixed) thereon is preliminarily prepared, which is successively poured into a plurality of wells in a certain amount. For this pouring operation, a certain time is required. If the phosphor beads have a large specific gravity, the phosphor beads begin to sediment before a stirring operation is started after the completion of the pouring operation, and accordingly there may be a difference in the concentration of the phosphor beads among the plurality of wells, which may cause decrease in accuracy of measurement. To avoid this, it is required to carry out the pouring operation while stirring the liquid in the well, such being extremely troublesome. Further, while successively pouring the preliminarily prepared slurry of the phosphor beads into the plurality of wells, sedimentation of the phosphor beads takes place in the slurry, and there may be a difference in the content of the phosphor beads poured among samples even if the same amount of the slurry is poured, and this is one reason to cause decrease in measurement accuracy.

SUMMARY OF THE INVENTION

Under these circumstances, the present invention has been made to overcome the above problems, and it is an object of the present invention to provide a phosphor consisting of hollow particles, most of which can easily be excited by an excitation source having a weak penetrating power, such as a fluorescent lamp, PDP or VFD, and its production process, and to provide a phosphor slurry in which non-uniformity in sedimentation is hardly caused in a case where a fluorescent layer is formed by sedimentation coating method.

It is also an object of the present invention to provide spherical or substantially spherical phosphor beads suitable for the above analysis using tracer technique and their production process.

In order to solve the above problems, the present inventors have conducted extensive studies particularly on the shape of the phosphor and as a result, succeeded in production of a phosphor consisting of hollow particles, each hollow particle having a predetermined volume of a space in the inside thereof, by a method of forming a mixed solution of raw material compounds into droplets, and drying the droplets under specific conditions, followed by thermal decomposition, not by a method of baking a mixture of raw materials so that a solid reaction takes place. Most of this phosphor can easily be excited by an excitation source having a weak penetrating power, and accordingly the phosphor can effectively emit light.

Further, this phosphor can be made to have a desired apparent specific gravity by adjusting the proportion of the hollow portion, and accordingly in a mixed phosphor slurry containing a plural types of phosphors having different emission colors, the difference in the specific gravity among the phosphors mixed can be minimized so that there will be substantially no difference in sedimentation rate during coating, whereby a fluorescent layer having a uniform composition can be formed, and non-uniformity in the emission colors can be prevented.

Further, since phosphor beads composed of this phosphor have a small specific gravity, sedimentation in a liquid can be suppressed, and since they have excellent dispersibility, analysis using tracer technique with a high accuracy becomes possible by using the beads as a tracer.

According to a first aspect of the present invention, there is provided a phosphor consisting of hollow particles, each hollow particle having an outer shell and a space in the inside of said outer shell.

According to a second aspect of the present invention, there is provided the above phosphor consisting of hollow particles, wherein the space is present at the approximately center portion of each hollow particle.

According to a third aspect of the present invention, there is provided the above phosphor consisting of hollow particles, wherein the volume of the space is from 15 to 85 vol % of the volume of the entire hollow particle.

According to a fourth aspect of the present invention, there is provided the above phosphor consisting of hollow particles, wherein the volume of the space is from 30 to 75 vol % of the volume of the entire hollow particle.

According to a fifth aspect of the present invention, there is provided the above phosphor consisting of hollow particles, wherein the ratio of the maximum particle size to the minimum particle size of each hollow particle is from 1.0 to 1.2.

According to a sixth aspect of the present invention, there is provided the above phosphor consisting of hollow particles, wherein at least part of the outer shell is made of one layer of crystallite.

According to a seventh aspect of the present invention, there is provided a phosphor slurry containing a plural types of phosphors having different emission colors, wherein among the phosphors, at least one phosphor having a large specific gravity is the above phosphor consisting of hollow particles.

According to an eighth aspect of the present invention, there is provided a process for producing a phosphor consisting of hollow particles, which comprises spraying a solution containing metal elements constituting the phosphor into a carrier gas to obtain fine droplets, and drying the fine droplets to form hollow particles, followed by thermal decomposition.

According to a ninth aspect of the present invention, there is provided the above process for producing a phosphor consisting of hollow particles, wherein formation of the hollow particles is carried out by adjusting the rate of drying the droplets so that the surface of the droplets maintains the critical concentration of supersaturation, and the center portion has a concentration lower than the equilibrium concentration of saturation.

According to a tenth aspect of the present invention, there is provided the above process for producing a phosphor consisting of hollow particles, wherein the droplets are adjusted to have an average particle size of from 0.5 to 100 $\mu$m and dried at a temperature of from 100 to 400° C. for from 0.1 to 5 seconds to form the hollow particles.

According to an eleventh aspect of the present invention, there is provided the above process for producing a phosphor consisting of hollow particles, wherein the drying is followed by the thermal decomposition step while maintaining the hollow particles at a temperature of at least 100° C.

According to a twelfth aspect of the present invention, there is provided the above process for producing a phosphor consisting of hollow particles, wherein the above thermal decomposition is carried out at a temperature of from 500 to 1,900° C.

According to a thirteenth aspect of the present invention, there is provided the above process for producing a phosphor consisting of hollow particles, wherein the phosphor is a phosphor comprising an oxide as a primary phase, and the above thermal decomposition temperature is adjusted within a range of from 1,200 to 1,900° C.

According to a fourteenth aspect of the present invention, there is provided the above process for producing a phosphor consisting of hollow particles, wherein the phosphor is a phosphor comprising a sulfide as a primary phase, and the above thermal decomposition temperature is adjusted within a range of from 500 to 1,100° C.

According to a fifteenth aspect of the present invention, there is provided the above process for producing a phosphor consisting of hollow particles, wherein the phosphor is a phosphor comprising an oxysulfide as a primary phase, and the above thermal decomposition temperature is adjusted within a range of from 700 to 1,300° C.

According to a sixteenth aspect of the present invention, there is provided the above process for producing a phosphor consisting of hollow particles, wherein the thermal decomposition time is adjusted within a range of from 0.5 second to 10 minutes.

According to a seventeenth aspect of the present invention, there is provided phosphor beads for analysis using tracer technique to be used to determine an organic substance, a reactant which reacts with the organic substance, or a substance inhibiting the binding of the organic substance to the reactant, by utilizing the binding of the organic substance to the reactant, wherein either the organic substance or the reactant is fixed to a radioactive labeled compound and the other is fixed to the phosphor beads, said phosphor beads being spherical or substantially spherical hollow particles, each hollow particle having a median particle size of from 0.01 to 10 $\mu$m.

According to an eighteenth aspect of the present invention, there is provided the above phosphor beads for tracer analysis, wherein the median particle size is from 0.02 to 8.0 $\mu$m.

According to a nineteenth aspect of the present invention, there is provided phosphor beads for analysis using tracer technique to be used to determine an organic substance, a reactant which reacts with the organic substance, or a substance inhibiting the binding of the organic substance to the reactant, by utilizing the binding of the organic substance to the reactant, wherein either the organic substance or the reactant is fixed to a radioactive labeled compound and the other is fixed to the phosphor beads, said phosphor beads being spherical or substantially spherical solid particles, each solid particle having a median particle size of from 0.01 to 8 $\mu$m.

According to a twentieth aspect of the present invention, there is provided the above phosphor beads for tracer analysis, wherein the median particle size is from 0.02 to 2.0 $\mu$m.

According to a twenty-first aspect of the present invention, there is provided the above phosphor beads for analysis using tracer technique, wherein the ratio of the maximum particle size to the minimum particle size is from 1.0 to 1.2.

According to a twenty-second aspect of the present invention, there is provided the above phosphor beads for analysis using tracer technique, wherein the volume of the hollow part in each hollow particle is from 15 to 85 vol % of the volume of the entire particle.

According to a twenty-third aspect of the present invention, there is provided the above phosphor beads for analysis using tracer technique, which comprise a host material of a metal oxide.

According to a twenty-fourth aspect of the present invention, there is provided the above phosphor beads for analysis using tracer technique, wherein the host material of a metal oxide is $Y_2O_3$.

According to a twenty-fifth aspect of the present invention, there is provided the above phosphor beads for analysis using tracer technique, wherein activating ions for the phosphor beads are $Eu^{3+}$.

According to a twenty-sixth aspect of the present invention, there is provided a process for producing the above phosphor beads for analysis using tracer technique, which comprises spraying an aqueous solution containing raw materials for a phosphor into a carrier gas to obtain fine droplets, and drying the fine droplets in a gas flow to form particles, followed by thermal decomposition to produce hollow or solid spherical or substantially spherical phosphor beads.

BRIEF DESCRIPTION OF THE DRAWINGS

FIG. 1a is a diagram illustrating the concentration of a solution with respect to a droplet before drying from the center portion to the outer periphery, and FIG. 1b is a diagram illustrating the concentration of a solution with respect to a metal salts particle from the center portion to the outer periphery when crystals begin to precipitate and illustrating an area where crystals precipitate.

FIGS. 2a and 2b are diagrams illustrating conditions under which solid particles are formed.

DETAILED DESCRIPTION OF THE PREFERRED EMBODIMENTS

Figure 3B:
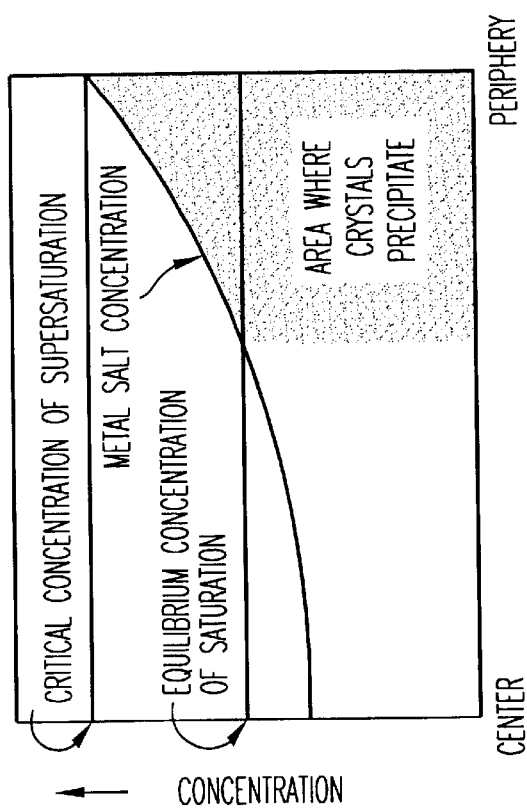
FIGS. 3a and 3b are diagrams illustrating conditions under which hollow particles are formed.

To produce the phosphor consisting of hollow particles of the present invention, an aqueous solution of metal salt compounds, containing metal elements constituting a desired phosphor, is prepared firstly, which is formed into fine droplets. As the material aqueous metal salt compound solution, any metal salt compound which is soluble in water and which undergoes thermal decomposition to form an oxide when heated to a high temperature, such as a salt containing a metal element or an organic metal compound, may be used. Further, it is also possible to use an aqueous metal salts solution obtained by dissolving oxides of metal elements constituting the phosphor in an acid.

To easily synthesize the phosphor of the present invention, it is particularly preferred to use an aqueous solution of nitrates or acetates of metal elements constituting the phosphor. An aqueous solution of nitrates or acetates of metals is formed into fine droplets, followed by drying and heating so that thermal decomposition easily takes place to produce a phosphor, and accordingly at least 10 wt %, particularly at least 50 wt %, of the metal salts dissolved in the aqueous metal salts solution is preferably nitrates or acetates.

To such an aqueous metal salts solution, a metal element other than the metal elements constituting the phosphor or an additive may be added with various purposes. For example, when a small amount of a flux is added to the aqueous solution, the thermal decomposition temperature can be lowered, and substantially spherical phosphor particles having a high crystallinity can be obtained in a short period of time.

Further, to synthesize a phosphor containing a sulfur element in the host material composition comprising a sulfide or an oxysulfide as the primary phase, a compound containing sulfur such as thiourea or thioacetamide as a starting raw material is preferably dissolved in the solution together with the metal salt compounds.

However, to obtain a phosphor having excellent emission properties, it is important to use a material solution having a low content of impurity elements such as iron or nickel to be a killer center.

The metal salts or the like as the above phosphor raw materials are put in water or an acid, followed by stirring for thorough dissolution. The concentration of the above elements in the raw material solution is adjusted in accordance with the diameter of droplets to be formed by spraying the aqueous solution relative to the desired diameter of phosphor particles. Namely, in order to increase the ratio of the droplet diameter to the phosphor particle diameter, the concentration of the solute in the raw material solution is lowered, and in order to decrease the ratio, the concentration of the solute is increased.

In order to synthesize an excellent phosphor, the solute concentration C of the metal elements in the raw material aqueous solution is adjusted so that $0.01 \leq C \leq 5$. Here, C represents the total number of mols of the entire metal elements contained in 1l of the raw material aqueous solution.

As a method of forming fine droplets from the raw material aqueous metal salts solution, a method of spraying the liquid while blowing up the liquid by pressurized air to form droplets of from 1 to 50 $\mu$m, a method of forming droplets of from 4 to 10 $\mu$m by utilizing an ultrasonic wave at a level of 2 MHz from a piezoelectric crystal, a method of oscillating an orifice having a pore size of from 10 to 20 $\mu$m by an oscillator, and supplying the liquid at a constant rate to discharge droplets of from 5 to 50 $\mu$m depending upon the oscillation frequency, a method of dropping the liquid at a constant rate on a rotating disk to form droplets of from 20 to 100 $\mu$m by centrifugal force, or a method of supplying a high voltage to the surface of the liquid to form droplets of from 0.5 to 10 $\mu$m, may, for example, be mentioned.

In the present invention, it is preferred to adjust the weight average particle size of the droplets to be from 0.5 to 100 $\mu$m, preferably from 1 to 50 $\mu$m, to form the hollow particles. The droplets are classified before the drying to adjust the average particle size by means of a classifier such as a classifier by gravity, a centrifugal classifier or an inertial classifier, so that the particle size of the phosphor to be obtained finally can be controlled.

The fine droplets formed as mentioned above, are introduced into a thermal decomposition furnace from a drying furnace together with gas flow and heated, followed by drying to form particles of the material metal salts, which are further heated for thermal decomposition to form desired phosphor particles.

By adjusting factors having an influence over the heating rate, such as type of the metal salts solution, the type of a carrier gas, the flow rate of the carrier gas and the temperature at a drying region in the thermal decomposition furnace, the shape and the surface state of the metal salts particles to be obtained by drying vary, and the particles may be e.g. hollow spheres, porous powder particles, solid particles or pulverized particles.

Namely, with respect to the drying of the droplets in the furnace, as the conceptual diagram is shown in FIG. 1, the droplets are heated in the carrier gas, the solvent such as water evaporates, and the metal salts begin to precipitate when the concentration shifts from the equilibrium concentration of saturation to the critical concentration of supersaturation. In general, crystals of metal salts precipitated in this critical supersaturation state grow. It is considered that in a part of droplets having a concentration exceeding the equilibrium concentration of saturation, crystals of the metal salts precipitate one after another. If the droplets are dried slowly, as shown in FIG. 2, the center portion has the equilibrium concentration of saturation or higher when the surface (periphery) of the droplets reaches the critical concentration of supersaturation, whereby crystals precipitate even in the center portion of the droplets, and solid particles are obtained in such a case.

Figure 3A:
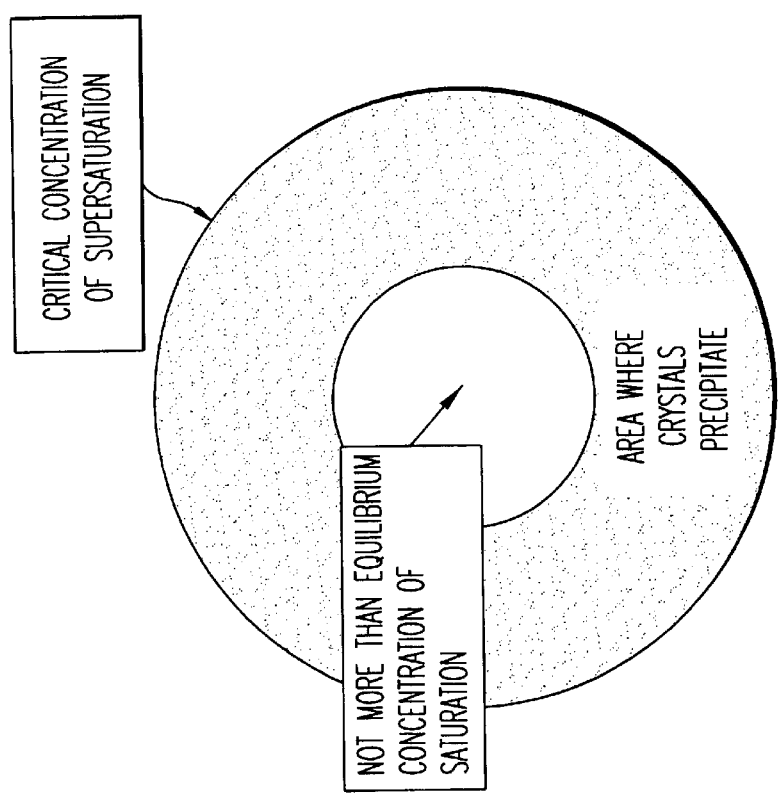

On the other hand, when the droplets are dried rapidly as shown in FIG. 3, the surface of the droplets reaches the critical concentration of supersaturation before the center portion reaches the equilibrium concentration of saturation, whereby crystals precipitate only at the surface, and then the solvent in the inside exudes on the surface and evaporates, and dried hollow particles can be obtained resultingly. However, when the drying rate is too high, the solvent suddenly vaporizes at the center portion before the solvent exudes on the surface, the particles explode, and crushed metal salt powder will be obtained.

To produce the phosphor consisting of hollow particles of the present invention, droplets are dried by heating in an atmosphere of from 100 to 400° C. for from 0.1 to 5 seconds under such drying conditions that the surface layer of each raw material metal salt droplet maintains the critical concentration of supersaturation, and the center portion has a concentration lower than the equilibrium concentration of saturation, to obtain metal salts particles having a space in the inside, although the condition varies depending upon factors having an influence over the above heating rate such as the solute concentration of the raw material metal salts solution. Depending upon the drying condition, metal salts particles, each particle having a volume of the space of at least 15 vol % of the volume of the entire particle as dried can be obtained, and by further adjusting the drying rate so that the volume of the space is at least 30 vol %, a phosphor consisting of hollow particles having significant difference in specific gravity and difference in thickness of the outer shell of particles, can be obtained, as compared with a conventional phosphor consisting of solid particles having the same composition.

However, if the volume of the space in each dried metal salt particle exceeds 85 vol %, the phosphor particle is likely to be crushed during formation of a fluorescent layer, and accordingly, the volume of the space is preferably at most 85 vol %, and it is more preferably at most 75 vol % in view of crush resistance. As mentioned above, by adjusting the drying conditions of the droplets to control the volume of the space in the metal salts particles after drying, the specific gravity of the phosphor may be controlled, or the thickness of the outer shell suitable for transmission of excitation light can be selected, and the significant decrease in the cost of fluorescent layer production becomes possible.

If the droplets are dried so rapidly that the drying time in the drying region is less than 0.1 second, the hollow particles tend to be crushed, and if the drying is carried out over a period exceeding 5 seconds, a phosphor consisting of solid particles may be formed.

The metal salts particles after drying are continuously made to stay in the heating furnace together with the carrier gas and heated for thermal decomposition to obtain the phosphor consisting of hollow particles of the present invention.

Here, the volume of the space in the hollow phosphor particles is obtained in such a manner that each particle is cut by a focused ion beam machining apparatus, the cross section is observed by a scanning electron microscope (SEM) to measure the outside diameter ro and the inner diameter rl of the particle, and $(rl/ro)^3 \times 100$ is calculated.

The drying step and the thermal decomposition step may be carried out stepwise in the same furnace by adjusting the temperature as mentioned above, or a drying furnace and a thermal decomposition furnace may separately be provided. In the latter case, it is preferred to keep the metal salts particles obtained by drying at a temperature of at least 100° C. when they are transferred from the drying furnace to the thermal decomposition furnace. If the temperature of the particles becomes less than 100° C. before the thermal decomposition, water vapor evaporated during drying condenses to partially re-dissolve the metal salts particles, whereby no hollow phosphor particles having desired shape and particle size can be obtained.

As the carrier gas to carry the droplets of the raw material metal salts solution and the metal salts particles, air, oxygen, nitrogen, hydrogen, or nitrogen or argon containing a small amount of hydrogen, may, for example, be used, and it is important to select the carrier gas depending upon the type of the primary phase of the phosphor or the type of the activating ion concerning light emission, in order to obtain good emission properties. In a case of synthesizing a phosphor comprising an oxide as the primary phase for example, preferred is air, oxygen, nitrogen, hydrogen, or nitrogen or argon containing a small amount of hydrogen.

On the other hand, in a case of synthesizing a phosphor comprising a sulfide or an oxysulfide as the primary phase, preferred is nitrogen, hydrogen, nitrogen or argon containing a small a mount of hydrogen, or nitrogen, hydrogen or argon containing hydrogen sulfide or carbon disulfide. Further, in a case where the activating ion is e.g. $Eu^{3+}$ which is likely to maintain the valency in an oxidizing atmosphere, preferred is an oxidizing gas such as air or oxygen, and in a case where the activating ion is e.g. $Eu^{2+}$ which is likely to maintain the valency in a reducing atmosphere, preferred is a reducing gas such as hydrogen, or nitrogen or argon containing a small amount of hydrogen.

The metal salts particles after drying are heated at a temperature of from 500 to 1,900° C. for thermal decomposition to obtain the phosphor of the present invention, although the thermal decomposition temperature varies depending upon the type of the phosphor to be obtained.

Figure 4:
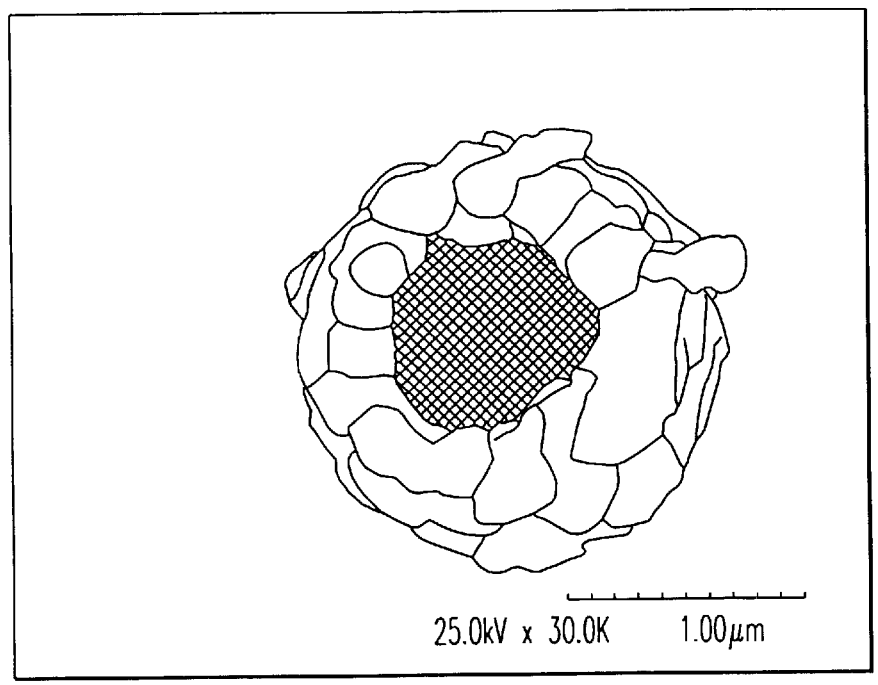
FIG. 4 is a diagram drawn from a photograph of a cut surface of a particle of the phosphor of Example 1, obtained by cutting the particle vertically to the particle surface, taken by a scanning electron microscope.
Figure 5:
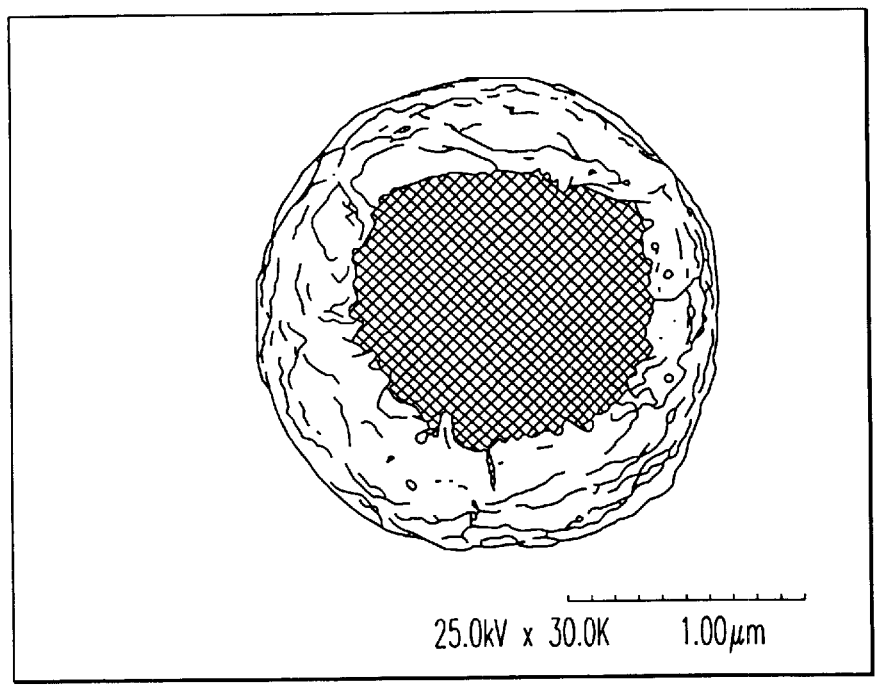
FIG. 5 is a diagram drawn from a photograph of a cut surface of a particle of the phosphor of Example 2, obtained by cutting the particle vertically to the particle surface, taken by a scanning electron microscope.
Figure 6:
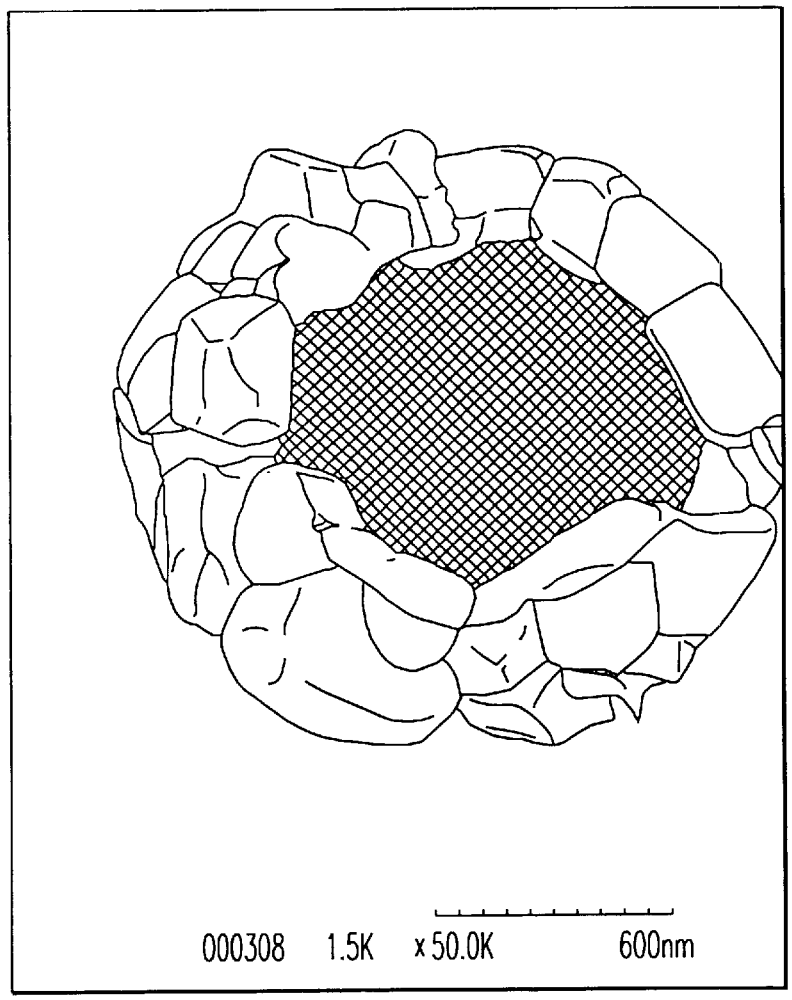
FIG. 6 is a diagram drawn from a photograph of a cut surface of a particle of the phosphor of Example 3, obtained by cutting the particle vertically to the particle surface, taken by a scanning electron microscope.
Figure 7:
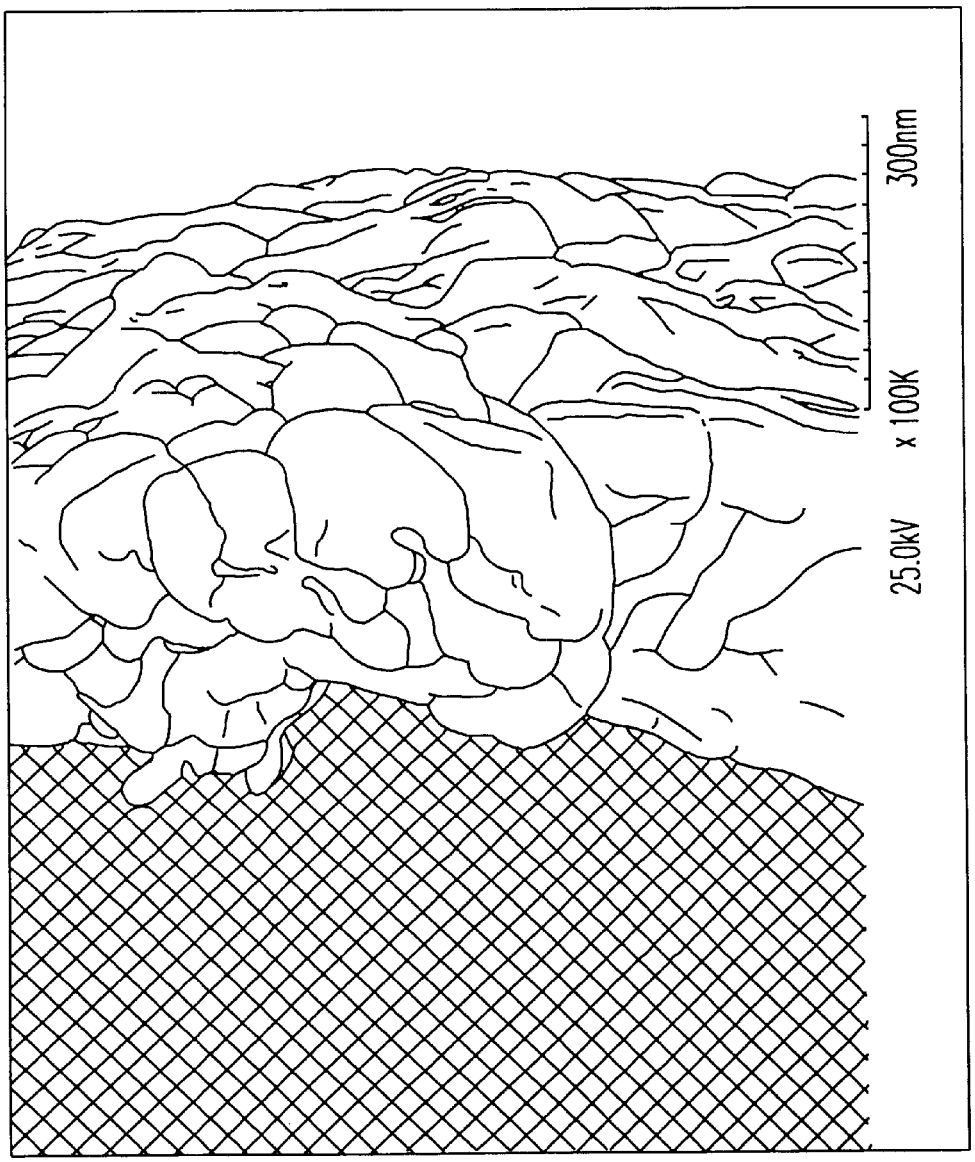
FIG. 7 is a diagram drawn from a photograph of a cut surface of a particle of the phosphor of Example 4, obtained by cutting the particle vertically to the particle surface, taken by a scanning electron microscope.

The phosphor of the present invention thus obtained consists of hollow particles, as evident from cross sections by electron microscope photographs shown in FIGS. 4 and 6, each hollow particle having an outer shell forming a surface layer and a space in the inside of said outer shell, having a substantially spherical shape in appearance with a ratio of the maximum particle size to the minimum particle size of particle of from 1.0 to 1.2, and at least part of the outer shell consisting of one layer of phosphor crystallites from the center direction towards the outer surface direction. Further, a phosphor consisting of hollow particles, wherein the outer shell consists of a plural phosphor crystallite layers, may be obtained, as shown in FIGS. 5 and 7, depending upon the selection of production conditions. The phosphor wherein the outer shell consists of one layer of phosphor crystallites has more excellent emission brightness.

If the thermal decomposition temperature of the metal salts particles after drying is lower than 500° C., the metal salts do not undergo thermal decomposition, whereby no phosphor is formed, and further, the crystallinity tends to be low, and the activation ions can not adequately activate the crystals, and the emission properties tend to be low. On the other hand, if the thermal decomposition temperature is higher than 1,900° C., an unnecessary energy tends to be consumed.

To produce a phosphor consisting of hollow particles comprising an oxide as the primary phase, a phosphor having a high crystallinity and good emission properties can be obtained by adjusting the thermal decomposition temperature within a range of from 1,200 to 1,900° C. The thermal decomposition temperature is more preferably from 1,400 to 1,900° C.

The residence time in the thermal decomposition furnace in the above thermal decomposition is selected preferably within a range of from 0.5 second to 10 minutes. If the residence time is shorter than 0.5 second, many layers composed of fine phosphor crystallites are formed at the outer shell portion, whereby the emission brightness tends to be low. If the reaction is carried out for at least 0.5 second, the phosphor consisting of hollow particles having a high emission brightness, at least a part of the outer shell consisting of one layer of phosphor crystallites from the center portion to the periphery, can be obtained. On the other hand, if the residence time exceeds 10 minutes, an unnecessary energy tends to be consumed.

To produce a phosphor consisting of hollow particles comprising a sulfide as the primary phase, a phosphor having a high crystallinity and good emission properties can be obtained by adjusting the thermal decomposition temperature within a range of from 500 to 1,100° C. The thermal decomposition temperature is more preferably from 600 to 1,050° C. The residence time in the thermal decomposition furnace is selected preferably within a range of from 0.5 second to 10 minutes.

To produce a phosphor consisting of hollow particles comprising an oxysulfide as the primary phase, a phosphor having a high crystallinity and good emission properties can be obtained by adjusting the thermal decomposition temperature within a range of from 700 to 1,300° C. The thermal decomposition temperature is more preferably from 800 to 1,200° C. The residence time in the thermal decomposition furnace is selected preferably within a range of from 0.5 second to 10 minutes.

The phosphor consisting of hollow particles of the present invention thus obtained is preferably further subjected to a heat treatment again in the thermal decomposition furnace. By conducting heating twice, the crystallite in the particles can be made to grow, and at the same time, the activating ions can uniformly activate the crystals, whereby a phosphor consisting of hollow particles having good emission properties can be obtained.

Now, the phosphor beads of the present invention will be explained in detail below.

In analysis using tracer technique to determine an organic substance, a reactant which reacts with the organic substance, or a substance inhibiting the binding of the organic substance to the reactant, by utilizing the binding of the organic substance to the reactant, wherein either the organic substance or the reactant, such as an antigen or an antibody, is fixed to a radioactive labeled compound and the other is fixed to phosphor beads, by using, as the phosphor beads, phosphor beads of spherical or substantially spherical hollow particles or solid fine particles having a certain specific particle size, the organic substance or the reactant can be uniformly fixed on the phosphor beads at a high concentration. Further, since sedimentation of the phosphor beads in a liquid in wells can be prevented to secure uniform dispersibility, the pouring operation into wells can be carried out easily, and non-uniformity in the reaction due to time lag in pouring can be suppressed, whereby analysis accuracy will be improved.

Examples of fluorescent materials to be used as the phosphor beads of the present invention are shown below.

$3Ca_3(PO_4)_2 \cdot Ca(F, Cl)_2$: $Sb^{3+}$
$3Ca_3(PO_4)_2 \cdot Ca(F, Cl)_2$: $Sb^{3+}$, $Mn^{2+}$,
$(Ba, Ca, Sr, Mg)_{10}(PO_4)_6 \cdot Cl_2$: $Eu^{2+}$,
$LaPO_4$: $Ce^{3+}$, $Tb^{3+}$,
$Zn_3(PO_4)_2$: $Mn^{2+}$,
$Zn_2SiO_4$: $Mn^{2+}$,
$Y_2SiO_5$: $Ce^{3+}$,
$(Ba, Sr)MgAl_{10}O_{17}$: $Eu^{2+}$,
$Sr_4Al_{10}O_{25}$: $Eu^{2+}$,
$Y_3Al_5O_{12}$: $Ce^{3+}$,
$(Y, Gd)_3(Al, Ga)_5O_{12}$: $Ce^{3+}$,
$CeMgAl_{11}O_{19}$: $Tb^{3+}$,
$Y_2O_3$: $Eu^{3+}$,
$Y_2O_2S$: $Eu^{3+}$,
$Y_2O_2S$: $Tb^{3+}$,
$La_2O_2S$: $Tb^{3+}$,
$YVO_4$: $Eu^{3+}$,
$Y(P, V)O_4$: $Eu^{3+}$,
$CaWO_4$
$CaWO_4$: $Pb^{2+}$,
ZnS: Ag,
ZnS: Cu,
ZnS: Mn,
ZnS: Cu, Al,
(Zn, Cd)S: Ag,
(Zn, Cd)S: Cu,
(Zn, Cd)S: Ag, Au, Al,
ZnO: Zn The fluorescent material is not particularly limited so long as it is a phosphor which absorbs radiation irradiated from RI such as γ rays or β rays and which can emit light. Among them, $Y_2O_3$: $Eu^{3+}$, $Y_2O_2S$: $Eu^{3+}$, $YVO_4$: $Eu^{3+}$, $Y(P, V)O_4$: $Eu^{3+}$, having a high red emission brightness, may be recommended.

The phosphor beads suitable for analysis using tracer technique of the present invention can easily be produced, in the same manner as the above phosphor consisting of hollow particles, by spraying an aqueous solution containing phosphor raw materials into a carrier gas to obtain fine droplets, and drying the fine droplets in gas flow to form particles, followed by thermal decomposition to produce spherical hollow phosphor beads. Specifically, firstly, an aqueous metal salts solution containing metal elements constituting the desired phosphor beads is prepared.

The aqueous metal salts solution is an aqueous solution having inorganic salts containing such metal elements or organic metal compounds dissolved in water, and any material which is decomposed into an oxide, a sulfide or an oxysulfide to be a host material of the phosphor by heating at a high temperature may be used. Here, as the above aqueous solution, an aqueous metal salts solution obtained by dissolving e.g. oxides of the phosphor raw materials in an acid may also be used. Further, to easily synthesize the phosphor beads, it is preferred to use an aqueous solution of nitrates or acetates as the phosphor materials.

With respect to the aqueous solution containing a phosphor raw material, the droplet size may optionally be selected by the same method of forming droplets as in the case of the above phosphor consisting of hollow particles, and the solute concentration of the metal elements in the aqueous metal salts solution is adjusted, to obtain phosphor beads having a desired average particle size. Among them, preferred is a method of spraying the aqueous metal salts solution into gas flow to obtain droplets, and drying the droplets in gas flow, followed by thermal decomposition in gas flow as the case requires, to produce the phosphor beads particles, whereby spherical particles can efficiently be produced.

The droplets of the aqueous metal salts solution are introduced into a thermal decomposition furnace accompanied by gas flow, and undergo thermal decomposition by heating to form phosphor beads. Depending upon factors having an influence over the heating rate, such as the type of the material aqueous metal salts solution, the type of the gas, the flow rate of the gas and the temperature in the furnace at a drying region, the metal salts particles to be obtained by drying may be any of e.g. solid spherical particles, hollow spherical particles and crushed irregular shaped particles. Further, it is possible to control the surface state. Particularly hollow phosphor beads are produced by carefully controlling the step of drying the droplets of the raw material aqueous metal salts solution, in the same manner as in the case of the above phosphor consisting of hollow particles.

The phosphor beads of the present invention are preferably spherical or approximately spherical, more particularly, they preferably have a ratio of the maximum particle size to the minimum particle size of from 1.0 to 1.2, more preferably from 1.0 to 1.1. If the ratio of the maximum particle size to the minimum particle size exceeds 1.2, the viscosity of a dispersion containing the phosphor beads tends to be high, and the fluidity tend to decrease, whereby uniform stirring and mixing tend to be difficult, which may impair pouring of the dispersion. Here, the median particle size of the phosphor beads is an average value of ten particles measured using images by SEM.

Among the phosphor beads of the present invention, hollow phosphor beads comprising hollow particles, each hollow particle having an outer shell (outer surface layer), wherein the outer shell has a good crystallinity, and at least a part of the outer shell consists of one layer of crystallite from the periphery to the inside, have a high emission efficiency, and by using them, detection of a bound complex of an organic substance to be measured and its reactant can be carried out more accurately and the measurement accuracy can be maintained high.

When the phosphor beads for analysis using tracer technique of the present invention are hollow particles, the median particle size is preferably within a range of from 0.01 to 10 μm, and when they are solid particles, the median particle size is preferably within a range of from 0.01 to 8 μm. In either case, if the median particle size is smaller than 0.01 μm, it tends to be difficult to secure dispersibility of the phosphor beads in the reaction system. Further, if the median particle size exceeds 8 μm, although the beads are easily dispersed in a liquid, but they sediment in a relatively short period of time, and accordingly dispersibility of the phosphor beads can not be secured unless stirring is securely kept until pouring into all the wells is completed, whereby the organic substance to be measured and its reactant can not uniformly be reacted, whereby reliability of the measurement tends to be low. However, even with phosphor beads having a median particle size exceeding 8 μm, the above problems can be avoided by making the particles to be hollow to decrease the specific gravity. In such a case of using hollow phosphor beads, the median particle size may be from 8 to 10 μm.

An organic substance consisting of a ligand such as an antigen, an antibody, a lectin or a glycoprotein is coated on the surface of the phosphor beads of the present invention, and a reactant which biochemically specifically reacts with the organic substance is coated on a radioactive labeled compound, and they are reacted to form a bound complex of the ligand and the reactant. In the bound complex, the phosphor beads are excited and emit light due to radiation from the radioactive labeled compound present at an extremely short distance from the phosphor beads. The light is detected by a photodetector such as CCD to determine the organic substance, which makes e.g. screening of new drugs very easy.

When the phosphor beads of the present invention consist of a red light-emitting phosphor activated by $Eu^{3+}$, only with a small amount of the phosphor beads, red light can be emitted from a ligand-reactant bound complex by radiation, and since a CCD device has a high spectral sensitivity to the red light emission, the amount of the ligand-reactant bound complex in a plurality of the wells can effectively be detected all at once by a CCD camera equipped with the CCD device. Among them, particularly preferred are phosphor beads wherein the host crystals are $Y_2O_3$, and the activating ions are $Eu^{3+}$, since they extremely effectively emit red light.

Now, the present invention will be described in further detail with reference to Examples and Comparative Examples. However, it should be understood that the present invention is by no means restricted to such specific Examples.

EXAMPLE 1

Yttrium nitrate and europium nitrate were dissolved in water so that the chemical composition of the phosphor would be $(Y_{0.94}, Eu_{0.06})_2O_3$, and a small amount of nitric acid was added thereto to adjust the solute concentration to 0.3 (mol/1 l aqueous solution), to prepare a uniform aqueous solution of metal salts containing Y and Eu.

Then, this solution was introduced into an ultrasonic atomizer to discharge fine droplets having a weight average particle size of 7.3 μm into air as a carrier gas, and then the fine droplets were heated as a heating rate of 150° C. per second and made to stay in a drying furnace of 200° C. for 2 seconds for drying while being flowed to obtain hollow metal salts particles.

The metal salts particles were transferred to a thermal decomposition furnace while keeping their temperature at 200° C., and made to stay in the thermal decomposition furnace having its maximum temperature kept at 1,600° C. for 10 seconds for thermal decomposition to obtain a phosphor of Example 1, consisting of particles, each particle having a space in the inside.

FIG. 4 is a diagram drawn from a photograph of a cut surface of a particle of the phosphor of Example 1 thus obtained, obtained by cutting the particle vertically to the particle surface, taken by a scanning electron microscope.

It was confirmed that the phosphor of Example 1 consisted of spherical hollow particles having uniform particle sizes, each hollow particle having an outer shell, wherein most of the outer shell was made of substantially one layer of phosphor crystallites from the inner surface toward the outer surface, as shown in FIG. 4. The particles had a weight average particle size of 1.9 μm. The volume of the hollow part was 31 vol % of the volume of the entire hollow phosphor particle as calculated from FIG. 4.

X-ray diffraction pattern was examined with regard to the phosphor Powder of Example 1, whereupon formation of a single phase phosphor without an impurity phase was found.

Further, emission spectrum was measured by irradiating the phosphor with ultraviolet rays having a wavelength of 254 nm, whereupon a spectrum distribution of good red light emission was found.

EXAMPLE 2

Using the aqueous metal salts solution used in Example 1, the same operation as in Example 1 was carried out to obtain a phosphor consisting of hollow particles of Example 2 except that the heating rate during heating and drying the fine droplets was 250° C. per second instead of 150° C. per second, and the residence time in the drying furnace was 0.3 second instead of 2 seconds.

FIG. 5 is a diagram drawn from a photograph of a cut surface of a particle of the phosphor of Example 2 thus obtained, obtained by cutting the particle vertically to the particle surface, taken by a scanning electron microscope.

It was confirmed that the phosphor of Example 2 consisted of spherical hollow particles having uniform particle sizes, each hollow particle having an outer shell, wherein the entire outer shell was made of a plural layers of fine phosphor crystallites from the outer surf toward the inner surface, as shown in FIG. 5. The particles had a weight average particle size of 2.1 μm. The volume of the hollow part was 39 vol % of the volume of the entire hollow phosphor particle as calculated from FIG. 5.

X-ray diffraction pattern was examined with regard to the phosphor Powder of Example 2, whereupon formation of a single phase phosphor without an impurity phase was found.

Further, emission spectrum was measured by irradiating the phosphor with ultraviolet rays having a wavelength of 254 nm, whereupon red light emission of 60% of that of the phosphor of Example 1 was shown.

EXAMPLE 3

Barium nitrate, europium nitrate, magnesium nitrate and aluminum nitrate were dissolved in water so that the chemical composition of the phosphor would be $(Ba_{0.9}, Eu_{0.1})MgAl_{10}O_{17}$, and a small amount of nitric acid was added thereto to prepare a uniform solution containing Ba, Mg, Al and Eu, having a solute concentration of 0.3 (mol/1l aqueous solution).

This solution was introduced into an ultrasonic atomizer to form fine droplets having a weight average particle size of 7.3 μm in a nitrogen gas containing 2 vol % of hydrogen as a carrier gas, and then these fine droplets were heated at a heating rate of 250° C. per second and made to stay in a drying furnace having its temperature kept at 200° C. for 0.3 second and dried while being flowed, to obtain hollow metal salts particles.

The metal salts particles were transferred to a thermal decomposition furnace while keeping their temperature at 200° C., made to stay the thermal decomposition furnace having its maximum temperature kept at 1,600° C. for 5 seconds for thermal decomposition, to obtain a phosphor of Example 3 consisting of hollow particles.

FIG. 6 is a diagram drawn from a photograph of a cut surface of the particle of the phosphor of Example 3 thus obtained, obtained by cutting the particle vertically to the particle surface, taken by a scanning electron microscope.

It was confirmed that the phosphor of Example 3 consisted of spherical hollow particles having uniform particle sizes, each hollow particle having an outer shell, wherein most of the outer shell was made of substantially one layer of phosphor crystallites from the inner wall toward the outer surface, as shown in FIG. 6. The particles had a weight average particle size of 1.7 μm. The volume of the hollow part was 36% of the volume of the entire phosphor particle, as calculated from FIG. 6.

Then, X-ray diffraction pattern was examined with regard to the phosphor Powder of Example 3, whereupon formation of a single phase phosphor without an impurity phase was found.

Further, emission spectrum was measured by irradiating the phosphor with ultraviolet rays having a wavelength of 254 nm, whereupon a spectrum distribution of good blue light emission was confirmed.

EXAMPLE 4

Using the aqueous metal salts solution of Example 3, the same operation as in Example 3 was carried out to obtain a phosphor of Example 4 except that the residence time in the thermal decomposition furnace was 0.3 second instead of 5 seconds.

FIG. 7 is a diagram drawn from a photograph of a part of a cut surface of the particle of the phosphor of Example 4 thus obtained, obtained by cutting the particle vertically to the particle surface, taken by a scanning electron microscope.

It was confirmed that the phosphor of Example 4 consisted of spherical hollow particles having uniform particle sizes, each hollow particle having an outer shell, wherein the outer shell was made of a plural layers of fine phosphor crystallites from the outer surface toward the inner surface, as shown in FIG. 7. The particles had a weight average particle size of 1.7 μm. The volume of the hollow part was 35 vol % of the volume of the entire phosphor particle as calculated from FIG. 6.

X-ray diffraction pattern was examined with regard to the phosphor Powder of Example 4, whereupon formation of a single phase phosphor without an impurity phase was confirmed.

Further, emission spectrum was measured by irradiating the phosphor with ultraviolet rays having a wavelength of 254 nm, whereupon blue light emission of 60% of that of the phosphor of Example 3 was shown.

EXAMPLE 5

Yttrium nitrate and europium nitrate were dissolved in water so that phosphor beads would have a chemical composition of $(Y_{0.94}, Eu_{0.06})_2O_3$, and a small amount of nitric acid was added thereto to preliminarily prepare a uniform aqueous metal salts solution having a solute concentration C of 0.3 mol/l.

This solution was introduced into an ultrasonic atomizer to form fine droplets having a median particle size of 7.3 μm. The fine droplets were introduced into a drying furnace employing air as a carrier gas, and the temperature was raised to 200° C. at a heating rate of 150° C. per second to obtain dried metal salts particles. The dried metal salts particles were transferred to a thermal decomposition furnace connected with the drying furnace while keeping the particles at a temperature of 200° C., and made to stay in the electric furnace (thermal decomposition furnace) at a maximum temperature of 1,600° C. for a residence time of 10 seconds for thermal decomposition to obtain phosphor beads.

The powder X-ray diffraction pattern was examined with respect to the obtained phosphor beads, whereupon formation of single phase phosphor beads without an impurity phase was confirmed. Further, the surface state of the particles was observed by a scanning electron microscope, whereupon the particles were spherical with uniform particle sizes, had a median particle size of 1.9 μm and had a ratio of the maximum particle size to the minimum particle size of 1.05. The cut surface of the phosphor beads was observed by a scanning electron microscope, whereupon it was found that the phosphor beads were hollow particles, each hollow particle having an outer shell, wherein the volume of the hollow part was 31% of the entire volume, and at least a part of the outer shell was made of one layer of crystallite from the outer surface toward the inner surface. Emission spectrum was measured by irradiating the phosphor beads with ultraviolet rays having a wavelength of 254 nm, whereupon good red light emission was shown.

The phosphor beads were dispersed in water, whereupon they were easily dispersed in water in a monodisperse state, and the phosphor beads once dispersed were in a stably dispersed state in water for a long period of time of at least twice conventional inorganic phosphor beads (median particle size: 4.2 μm, maximum particle size/minimum particle size=1.5).

Further, streptoavidin was coated on the surface of the phosphor beads, the beads were mixed with a biotin solution containing RI, and the mixture was left to stand for 6 hours, then the light emission amount was measured by a CCD camera, whereupon a light emission on the same level to that of conventional inorganic phosphor beads was shown with an amount of from half to one fifth of the weight of the conventional inorganic phosphor beads. Further, a light emission of from twice to five times was shown with the same amount by weight of the conventional phosphor beads, and accordingly, it was found that new drug screening can be carried out with a higher precision by the phosphor beads of the present invention as compared with a case of using conventional phosphor beads.

The present invention provides, by employing the above constitution, a phosphor consisting of hollow particles, the most part of which can easily be excited with an excitation source having a weak penetrating power, employed in e.g. a fluorescent lamp, PDP or VFD, and a mixed phosphor slurry with which a non-uniformity in sedimentation hardly occurs when a fluorescent layer comprising a mixed phosphor consisting of different phosphors is formed by sedimentation coating method, and further, the present invention makes uniform coating of a fluorescent screen possible.

Further, with respect to the phosphor beads of the present invention, an organic substance to be measured or its reactant can uniformly be fixed on the spherical phosphor beads, and sedimentation of the phosphor beads in a liquid can be suppressed, whereby a uniform dispersibility can be secured even when a pouring operation is carried out without stirring, and non-uniformity in reaction due to sedimentation of the phosphor beads can be avoided. As a result, by using the phosphor beads of the present invention, analysis using tracer technique can be carried out with a high precision, and in e.g. High Throughput new drug Screening analysis, many samples can be analyzed all at once by simultaneously taking light by a CCD camera as an image and determining the samples with a high precision.

The entire disclosure of Japanese Patent Application Nos. 2000-119634 filed on Apr. 20, 2000 and 2000-337219 filed on Nov. 6, 2000 including specification, claims, drawings and summary are incorporated herein by reference in its entirety.

What is claimed is:

1. A process for producing a phosphor consisting of hollow particles, which comprises spraying a solution containing metal elements constituting the phosphor into a carrier gas to obtain fine droplets, and drying the fine droplets in the carrier gas at a temperature of 100° C. to 400° C. for a time sufficient to form hollow particles, followed by thermal decomposition of the particles while retained in the carrier gas to form a shell consisting essentially of one or a plurality of layers of phosphor crystallites.

2. The process for producing a phosphor consisting of hollow particles according to claim 1, wherein formation of the hollow particles is carried out by adjusting the rate of drying the droplets so that the surface of the droplets maintains the critical concentration of supersaturation, and the center portion has a concentration lower than the equilibrium concentration of saturation and controlling the drying conditions so that the solvent in the inside will exude to the droplet surface and evaporate.

3. A process for producing a phosphor consisting of hollow particles, which comprises spraying a solution containing metal elements constituting the phosphor into a carrier gas to obtain fine droplets, and drying the fine droplets to form hollow particles, followed by thermal decomposition, wherein the droplets are adjusted to have an average particle size of from 0.5 to 100 μm and dried at a temperature of from 100 to 400° C. for from 0.1 to 5 seconds to form the hollow particles.

4. Phosphor beads for analysis using tracer technique to be used to determine an organic substance, a reactant which reacts with the organic substance, or a substance inhibiting the binding of the organic substance to the reactant, by utilizing the binding of the organic substance to the reactant, wherein either the organic substance or the reactant is fixed to a radioactive labeled compound and the other is fixed to the phosphor beads, said phosphor beads being spherical or substantially spherical hollow particles, each hollow particle having a median particle size of from 0.01 to 10 μm and wherein the outer shell consists essentially of one or a plurality of layers of phosphor crystallites, which comprise a host material of a metal oxide which is $Y_2O_3$.

5. A process for producing the phosphor beads for analysis using tracer technique to be used to determine an organic substance, a reactant which reacts with the organic substance, or a substance inhibiting the binding of the organic substance to the reactant, by utilizing the binding of the organic substance to the reactant, wherein either the organic substance or the reactant is fixed to a radioactive labeled compound and the other is fixed to the phosphor beads, said phosphor beads being spherical or substantially spherical hollow particles, each hollow particle having a median particle size of from 0.01 to 10 μm and wherein the outer shell consists essentially of one or a plurality of layers of phosphor crystallites, which comprises spraying an aqueous solution containing raw materials for a phosphor into a carrier gas to obtain fine droplets, and drying the fine droplets in a gas flow to form particles, followed by thermal decomposition while in the carrier gas to produce hollow spherical or substantially spherical phosphor beads whose shell consists essentially of one or more layers of phosphor crystallites.

6. Phosphor beads for analysis using tracer technique to be used to determine an organic substance, a reactant which reacts with the organic substance, or a substance inhibiting the binding of the organic substance to the reactant, by utilizing the binding of the organic substance to the reactant, wherein either the organic substance or the reactant is fixed to a radioactive labeled compound and the other is fixed to the phosphor beads, said phosphor beads being spherical or substantially spherical solid particles, each solid particle having a median particle size of from 0.01 to 8 μm and wherein the ratio of the maximum particle size to the minimum particle size is from 1.0 to 1.2, which comprise a host material of a metal oxide which is $Y_2O_3$.

* * * * *